US010214128B2

(12) United States Patent
Rockwell et al.

(10) Patent No.: US 10,214,128 B2
(45) Date of Patent: Feb. 26, 2019

(54) HAPTIC MOTOR

(75) Inventors: Christopher Mark Rockwell, Ann Arbor, MI (US); Michael David Franz, Macomb Township, MI (US); Alice Knoebel, Novi, MI (US); Douglas J. Krueger, Jr., Macomb, MI (US); Anup Viswanathan, Ann Arbor, MI (US); Daniel Jerome Wiegand, Macomb, MI (US)

(73) Assignee: TOYOTA BOSHOKU AMERICA, INC., Novi, MI (US)

( * ) Notice: Subject to any disclaimer, the term of this patent is extended or adjusted under 35 U.S.C. 154(b) by 817 days.

(21) Appl. No.: 13/475,081

(22) Filed: May 18, 2012

(65) Prior Publication Data

US 2013/0307302 A1 Nov. 21, 2013

(51) Int. Cl.
| | |
|---|---|
| B60N 2/70 | (2006.01) |
| B60N 2/90 | (2018.01) |
| B29C 65/00 | (2006.01) |
| B29C 65/08 | (2006.01) |
| B29L 31/00 | (2006.01) |
| B29L 31/34 | (2006.01) |

(52) U.S. Cl.
CPC ............ B60N 2/7017 (2013.01); *B29C 65/08* (2013.01); *B29C 66/1282* (2013.01); *B29C 66/12841* (2013.01); *B29C 66/54* (2013.01); *B29L 2031/3481* (2013.01); *B29L 2031/771* (2013.01); *B60N 2002/981* (2018.02)

(58) Field of Classification Search
CPC ............ B60N 2/7017; B60N 2002/981; B29L 2031/3481

USPC ....................................................... 297/217.3
See application file for complete search history.

(56) References Cited

U.S. PATENT DOCUMENTS

| | | | |
|---|---|---|---|
| 2,920,618 A | 1/1960 | Oster, Jr. | |
| 3,455,296 A | 7/1969 | McCaleb | |
| 5,647,633 A | 7/1997 | Fukuoka | |
| 6,682,494 B1 | 1/2004 | Sleichter, III et al. | |
| 6,744,370 B1 | 6/2004 | Sleichter, III et al. | |
| 6,873,892 B2 * | 3/2005 | Katz et al. ...................... 701/49 |

(Continued)

FOREIGN PATENT DOCUMENTS

| | | |
|---|---|---|
| CN | 2907059 | 5/2007 |
| DE | 102008036605 | 2/2010 |

(Continued)

OTHER PUBLICATIONS

Toyota, JP 2000-186635 A, Apr. 7, 2000, Espacenet database, Description Translation.*

(Continued)

*Primary Examiner* — David R Dunn
*Assistant Examiner* — Tania Abraham
(74) *Attorney, Agent, or Firm* — Carlson, Gaskey & Olds, P.C.

(57) ABSTRACT

A seat cushion of a vehicle seat includes a cushion made of foam and at least one motor assembly located in the cushion. The at least one motor assembly includes a housing having a first portion and a second portion, and one of the first portion and the second portion includes a meltable feature located near a location of contact of the first portion and the second portion. The meltable feature melts to secure the first portion of the housing to the second portion of the housing to retain a motor within the housing.

21 Claims, 4 Drawing Sheets

(56) References Cited

U.S. PATENT DOCUMENTS

| | | |
|---|---|---|
| 7,439,507 B2 | 10/2008 | Deasy et al. |
| 7,676,324 B2 | 3/2010 | Bae |
| 7,681,949 B2 | 3/2010 | Nathan et al. |
| 7,714,701 B2 | 5/2010 | Altan et al. |
| 2002/0121802 A1* | 9/2002 | McMillen .............. A47C 7/462 297/284.7 |
| 2004/0049323 A1 | 3/2004 | Tijerina et al. |
| 2007/0241595 A1 | 10/2007 | Nathan et al. |
| 2008/0055055 A1 | 3/2008 | Powell et al. |
| 2009/0015045 A1 | 1/2009 | Nathan et al. |
| 2010/0013614 A1* | 1/2010 | Sproelich et al. ......... 340/407.2 |
| 2010/0049407 A1 | 2/2010 | Hijikata et al. |

FOREIGN PATENT DOCUMENTS

| | | |
|---|---|---|
| GB | 2437158 | 10/2007 |
| JP | 50-155374 A | 12/1975 |
| JP | H0586253 U | 11/1993 |
| JP | 2000186635 | 7/2000 |
| JP | 2005-315022 A | 11/2005 |
| JP | 2008078967 | 4/2008 |
| JP | 20122342 | 1/2012 |
| WO | 2007/116788 A1 | 10/2007 |

OTHER PUBLICATIONS

International Search Report for PCT Application No. PCT/US2013/040034 completed Jul. 12, 2013.

Encapsulated Vibration Motors:: Pico Vibe™ Range, http://www.precisionmicrodrives.com/vibrating-vibrator-vibration-motors/encapsulated-vibration-motors.

Coin Vibration Motor:: Pico Vibe™ Range, http://www.precisionmicrodrives.com/vibrating-vibrator-vibration-motors/pancake-shaftless-coin-vibration-motors.

International Preliminary Report on Patentability for International Application No. PCT/US2013/040034 dated Sep. 4, 2014.

* cited by examiner

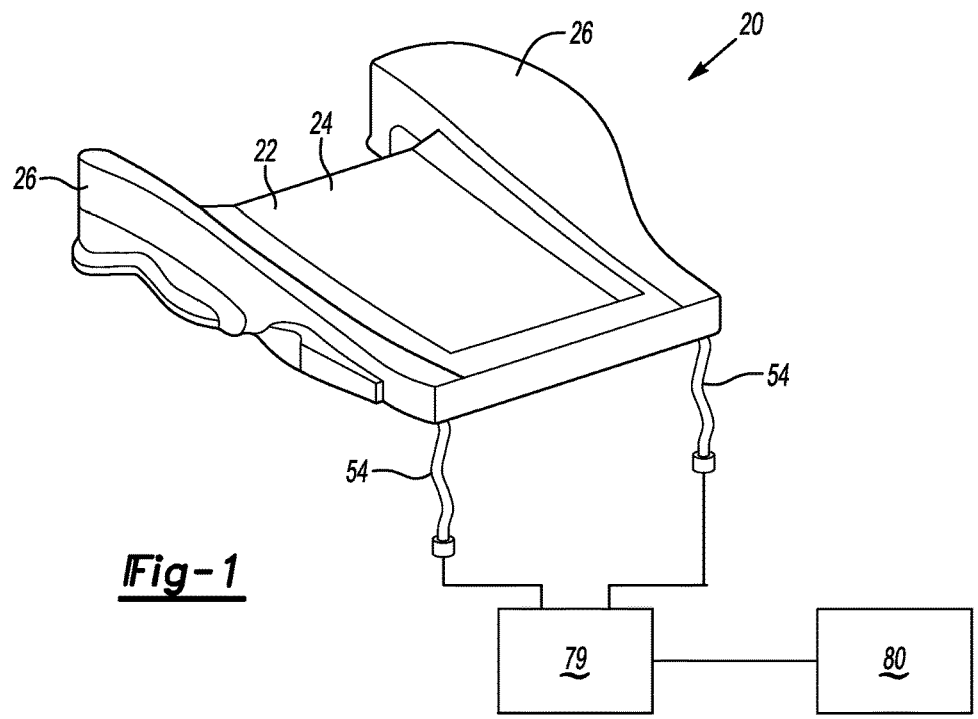
_Fig-1_
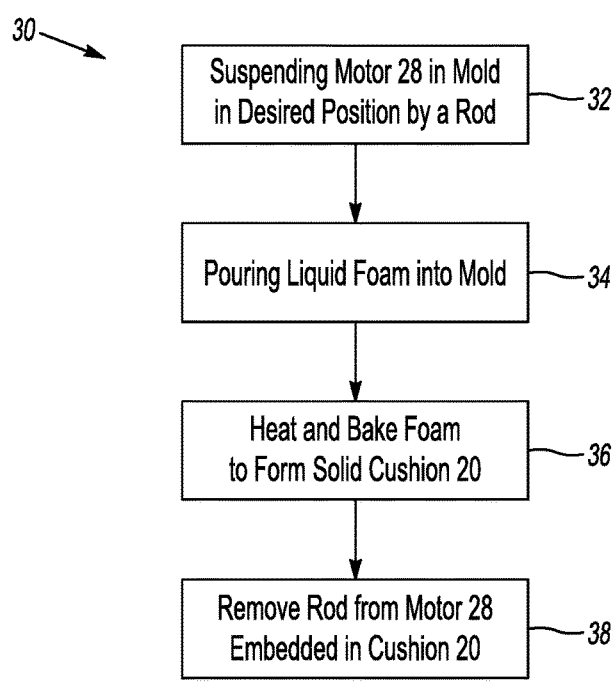
_Fig-2_

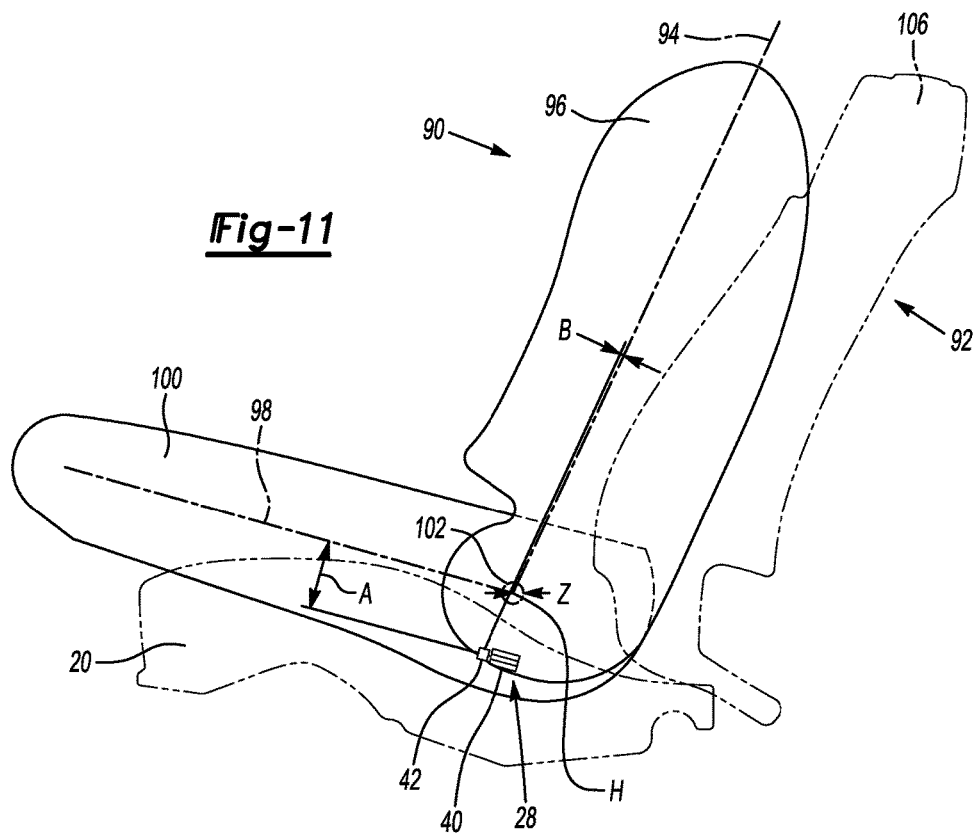
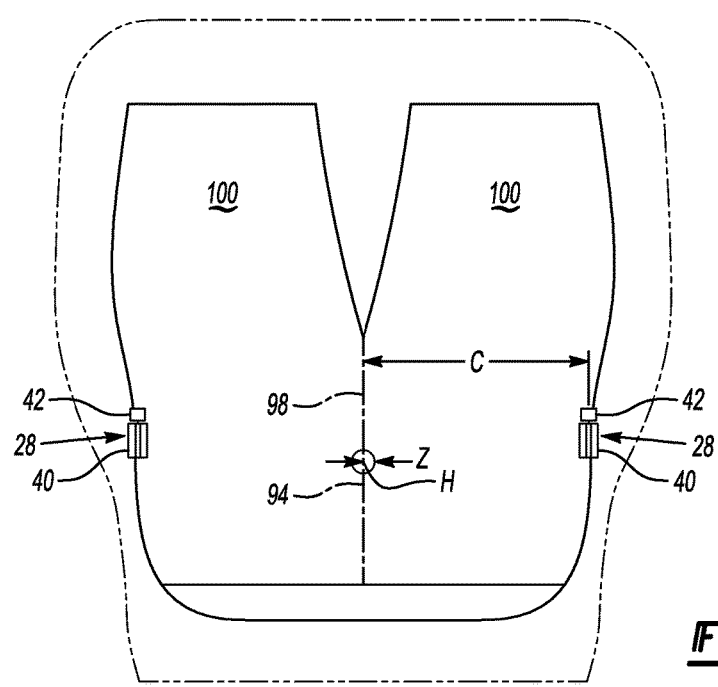

HAPTIC MOTOR

BACKGROUND OF THE INVENTION

A driver can be exposed to numerous audio and visual signals and stimuli during driving. If an event occurs while driving, an audio or visual alert can be generated to obtain the driver's attention. In one example, an event occurs when a sensor detects that a vehicle deviates from its lane. However, due to numerous other audio and visual signals and stimuli to which the driver is exposed, an audio or visual alert might not get the attention of the driver.

A tactile alert can be provided to alert the driver of an event. In one example, a motor located in a seat cushion vibrates when an event occurs to provide a tactile alert to the driver. Prior motors include a metal motor housing including portions that are secured together by fasteners. The metal housing is not water-resistant, and liquid foam cannot be used to form the seat cushion with the motor in place as the liquid foam could leak inside the metal housing. Therefore, the cushion is molded to include grooves that receive the motor. The motor is externally visible once the motor is positioned in one of the grooves. An additional pad may be located over the motor in the groove to provide a smooth surface.

SUMMARY OF THE INVENTION

A seat cushion of a vehicle seat includes a cushion made of foam and at least one motor assembly located in the cushion. The at least one motor assembly includes a housing having a first portion and a second portion, and one of the first portion and the second portion includes a meltable feature located near a location of contact of the first portion and the second portion. The meltable feature melts to secure the first portion of the housing to the second portion of the housing to retain a motor within the housing.

A vehicle seat system includes a cushion made of foam and at least one motor assembly located in the cushion. The at least one motor assembly includes a housing having a first portion and a second portion, and one of the first portion and the second portion includes a meltable feature located near a location of contact of the first portion and the second portion. The meltable feature melts to secure the first portion of the housing to the second portion of the housing to retain a motor within the housing, and the meltable feature is melted by sonic welding. The vehicle seat system also includes a sensor that detects a road event and sends a signal in response to the road event. The vehicle seat system also includes a controller that receives the signal from the sensor and sends another signal to the at least one motor to cause the at least one motor to vibrate in response to the road event.

A method of forming a seat cushion of a vehicle seat includes the step of locating a motor in one of a first portion and a second portion of a housing. The method further includes the step of positioning the other of the first portion and the second portion of the housing on the one of the first portion and the second portion of the housing, and one of the first portion and the second portion of the housing includes a meltable feature located near a location of contact of the first portion and the second portion. The method further includes the step of melting the meltable feature to secure the first portion to the second portion together and to retain and seal the motor within the housing.

These and other features of the present invention can be best understood from the following specification and drawings, the following of which is a brief description.

BRIEF DESCRIPTION OF THE DRAWINGS

FIG. 1 illustrates a perspective view of a cushion of a vehicle seat;

FIG. 2 illustrates a flowchart of a method of making the cushion;

FIG. 11 illustrate a side view of a driver sitting on the cushion of a vehicle seat including the motor; and FIG. 12 illustrates a top view of the driver sitting on the cushion of the vehicle seat including the motor.

DETAILED DESCRIPTION OF THE PREFERRED EMBODIMENTS

Figure 3:
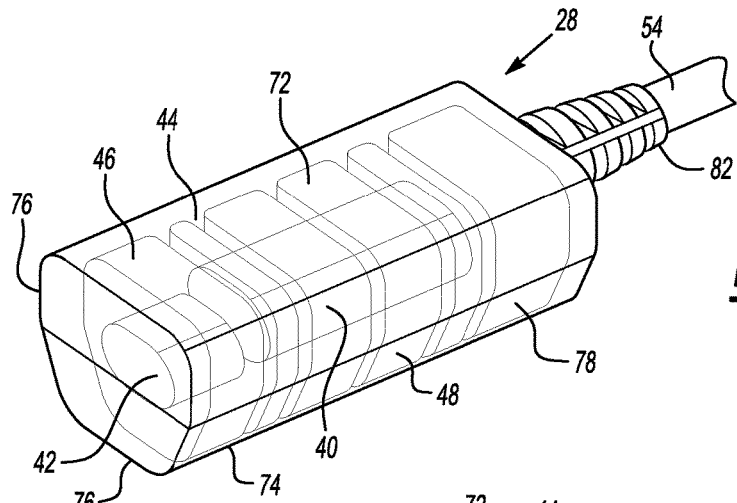
FIG. 3 illustrates a perspective view of a motor showing internal components.

FIG. 1 illustrates a cushion 20 of a vehicle seat. The cushion 20 is formed by a molding process (described below) and includes a seat portion 22 having a substantially flat upper surface 24 and two side bolsters 26 each located on one side of the seat portion 22. In one example, the cushion 20 is made of foam. In one example, the cushion 20 is made of polyurethane foam.

As discussed below, at least one motor 28 (shown in FIGS. 3, 4 and 5) is embedded within the cushion 20 at a desired location. In one example, the at least one motor 28 is completely embedded within the foam of the cushion 20 such that the at least one motor 28 is not visible when viewing an external surface of the cushion 20. In another example, the at least one motor 28 could be use with a cushion that includes pre-formed grooves in which the at least one motor 28 can be located. In one example, there are two motors 28 that are each embedded in one of the two side bolsters 26.

FIG. 2 illustrates a method 30 of making the cushion 20. In step 32, at least one motor 28 is suspended by a rod (not shown) or similar structure in a desired position within a mold (not shown). A rod with a magnetic tip or a mechanical device can be employed to retain the at least one motor 28 in the desired position. In step 34, liquid foam is poured into the mold. In one example, the liquid foam is polyurethane foam. In step 36, the foam is heated and/or baked, and the foam expands and solidifies to form the solid cushion 20. As a result, the at least one motor 28 is encapsulated and embedded in the foam of the cushion 20. In step 38, the rod is then removed from the at least one motor 28, defining a hole in the foam of the cushion 20 where the rod was previously positioned. In one example, removal of the rod defines an approximately 6 mm diameter hole in the cushion 20 where the rod was previously located.

Figure 4:
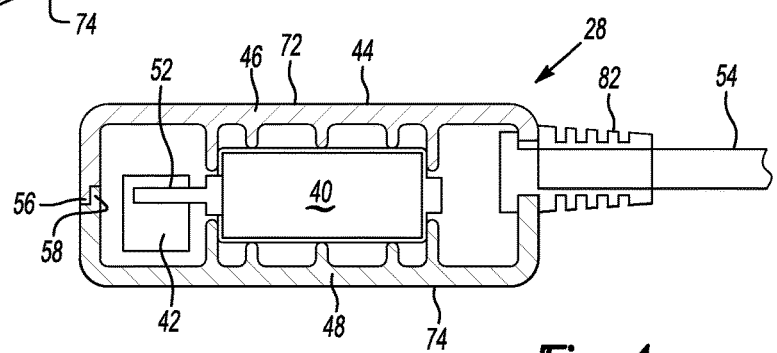
FIG. 4 illustrates a side cross-sectional view of the motor.
Figure 5:
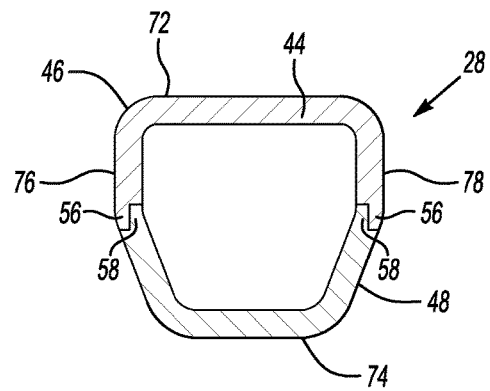
FIG. 5 illustrates a front cross-sectional view of the motor.

FIGS. 3, 4 and 5 illustrate a motor 28 that is embedded in the cushion 20. In one example, the at least one motor 28 is a haptic motor. In one example, the at least one motor 28 is a vibration motor. The motor 28 includes a DC motor 40 and an eccentric weight 42, or a counter weight, located within a sealed housing 44. In one example, the housing 44 is made of nylon. There is no contact between the eccentric weight 42 and the housing 44. In one example, there is a minimum clearance of approximately 1.4 mm between the eccentric weight 42 and the housing 44. There is no looseness or rattle allowance between the DC motor 40 and the housing 44, preventing any abnormal noise due caused by DC motor 40 to housing 44 vibration. Additionally, there is no looseness or rattle between the eccentric weight 42 and a motor shaft 52. Finally, as the housing 44 is sealed, the rotating parts of the motor 42 are protected from the environment, preventing erosion and corrosion. A wire harness subassembly 54 extends from the motor 28. The wire harness subassembly 54 is secured to the motor 28 by a grommet 82.

Returning to FIG. 1, the wire harness subassembly 54 allows communication between the motor 28 and a controller 79. The controller 79 is also in communication with a sensor 80 that detects a road event, as explained below.

The housing 44 includes an upper portion 46 and a lower portion 48 secured together by welding. In one example, the upper portion 46 and the lower portion 48 are secured together by sonic welding. Once welded, the housing 44 is leak proof and sealed, which prevents the liquid foam from entering the housing 44 and affecting the operation of the at least one motor 28. The housing 44 also eliminates minimum free play or vibration loss in the housing 44. In one example, the upper portion 46 and the lower portion 48 are each substantially u-shaped.

As shown in FIG. 5, the housing 44 includes a top surface 72, a bottom surface 74, a first longitudinal surface 76 and a second longitudinal surface 78. In one example, the top surface 72 is substantially flat. In one example, the bottom surface 74 includes a portion that is substantially rounded. In the example of FIG. 4, the top surface is parallel to the motor shaft 52.

The shape of the housing 44 can be designed for maximum comfort. The surface area of the top surface 72 of the housing 46 is maximized (that is, it is substantially flat) to distribute the contact load over the broadest possible area without extending beyond the natural intrinsic width and length of the motor 28. In one example, the top surface 72 of the housing 44 is substantially parallel to a top surface 110 of the bolster 26 of the cushion 20 (shown in FIG. 10). A strong bond forms between the upper portion 46 and the lower portion 48 of the housing 44 such that the housing 44 can accept pressure, such as the pressure applied by a knee of person when kneeling on the vehicle seat.

Figure 6:
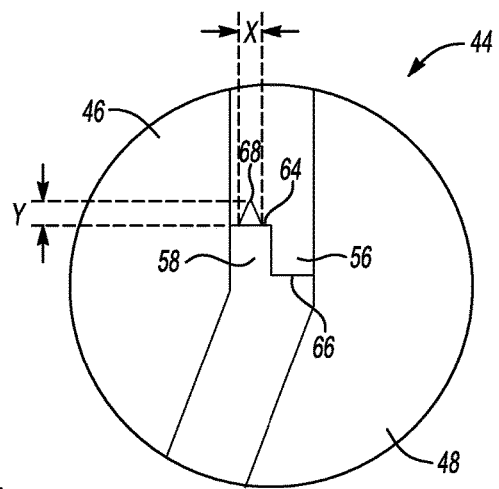
FIG. 6 illustrates a cross-sectional view of a housing of the motor including projections and grooves of each of an upper portion and a lower portion of the housing.

As show in FIG. 6, a perimeter of each of the upper portion 46 and the lower portion 48 includes a projection 56 and 58, respectively, that engages a groove 64 and 66, respectively, of the other of the projections 56 and 58, respectively, when the upper portion 46 and the lower portion 48 are placed together. Each groove 64, 66 is defined in a respective ledge. The projections 56 and 58 extend around an entire perimeter of the upper portion 46 and the lower portion 48, respectively, except at the location where the grommet 82 is received in the housing 44. In one example, the projection 58 of the lower portion 48 is located inwardly with respect to the projection 56 of the upper portion 46.

One of the projections 56 and 58 includes a bead 68 that extends around the perimeter of the respective projection 56 and 58 and is located near a location of contact of the upper portion 46 and the lower portion 48 of the housing 44 when placed together. In one example, the bead 68 is located in the groove 64 of the upper portion 46 of the housing 44. In one example, the bead 68 has a generally triangular shape having a width X and a height Y. In one example, the width X is approximately 0.3 mm, and the height Y is approximately 0.3 mm. When the upper portion 46 and the lower portion 48 are positioned together and are sonic welded, the bead 68 melts and fills in the grooves 64 and 66, securing the upper portion 46 and the lower portion 48 together.

Figure 7:
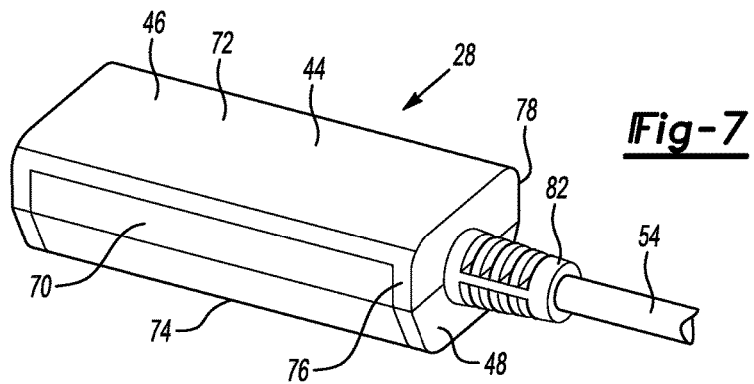
FIG. 7 illustrates a perspective view of the motor including an adhesive on the housing.

As shown in FIG. 7, in one example, an adhesive 70 can be employed to secure the housing 44 to the foam of the cushion 20 when the at least one motor 28 is used with a cushion that includes pre-formed grooves in which the at least one motor 28 can be received. In one example, the adhesive 70 is double sided peel and stick tape. In one example, the adhesive 70 is applied to one or more of the top surface 72, the bottom surface 74, the first longitudinal surface 76 and the second longitudinal surface 78 of the housing 44. However, it is possible for no adhesive to be employed as the housing 44 of the motor 28 is embedded in the foam of the cushion 20 during the molding process described in FIG. 2.

Figure 8:
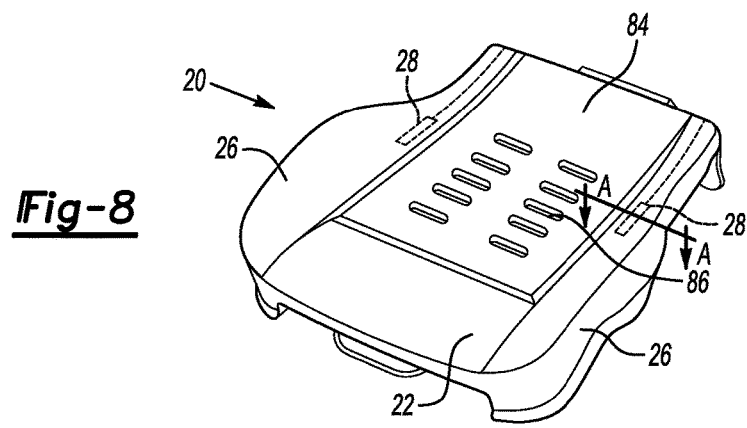
FIG. 8 illustrates a perspective view of the cushion with ventilation foam placed over an upper surface of the cushion.

FIG. 8 illustrates a perspective view of the cushion 20 including two motors 28 (shown in phantom) each embedded in one of the two bolsters 26. A mat 84 is located over the flat upper surface 24 of the seat portion 22 of the cushion 20. The mat 84 includes holes 86 that allow for ventilation. In one example, the mat 84 is made of polyester.

Figure 9:
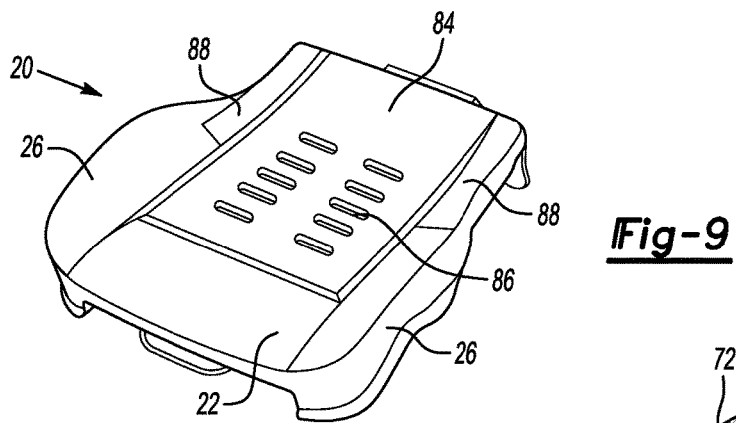
FIG. 9 illustrates a perspective view of foam placed over the motors embedded in the cushion.

FIG. 9 illustrates a perspective of the cushion 20 including a piece of foam 88 located over each of the two motors 28 on an exterior surface of the cushion 20. In one example, a piece of foam 88, such as a mat, can be located over the two motors 28 to provide additional cushioning to protect the motors 28 and to also prevent the motors 28 from causing driver discomfort. In one example, each piece of foam 88 is made of polyurethane. However, in another example, there is no piece of foam 88 located over each of the two motors 28 as the embedding of the two motors 28 in the cushion 20 provides cushioning.

Figure 10:
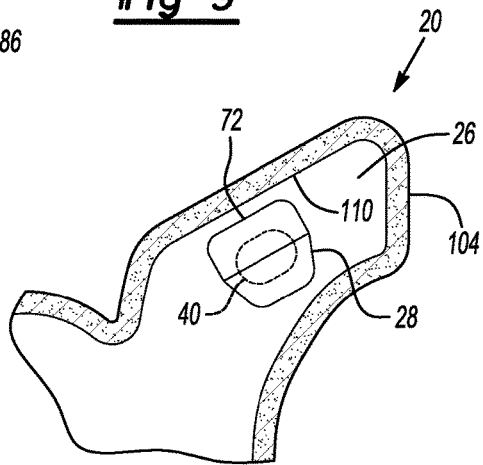
FIG. 10 illustrates a cross-sectional view of the cushion taken along lines A-A of FIG. 8.

FIG. 10 illustrates a cross-sectional view of a portion of the cushion 20 taken along line A-A of FIG. 8. As shown, the foam material of the cushion 20 surrounds and is located above the motors 28 such that the motors 28 are embedded within the cushion 20 and are not visible when viewing the cushion 20 from an external perspective. A trim cover 104 is located over the cushion 20 and provides an external surface of the vehicle seat in which the driver sits while driving.

The at least one motor 28 is positioned in the cushion 20 such that it will vibrate to provide a tactile signal that will be felt by the driver when activated by the controller 79. However, the at least one motor 28 is positioned to prevent pinching of and pressure on the driver. As explained below, the at least one motor 28 is positioned such that vibrations generated by the at least one motor 28 will be felt by the $5^{th}$ percentile female based on size and the $95^{th}$ percentile male based on size.

FIG. 11 illustrates a side view of a driver 90 sitting in a vehicle seat 92, and FIG. 12 illustrates a top view of the driver 90 sitting in the vehicle seat 92. A torso centerline 94 extends through a center body 96 of the driver 90 when seated in the vehicle seat 92. A thigh centerline 98 is substantially parallel to a thigh 100 of the driver 90 when seated in the vehicle seat 92 and extends through the center body 96. The torso centerline 94 and the thigh center line 98 intersect at a point H, or the H point. A plane (not shown) is defined by the torso centerline 94 and the thigh centerline 98. A circle 102 is defined around the point H having a radius of Z. In one example, Z is approximately 12.5 mm. The center body 96 of the driver 90 rests against a backrest 106 of the vehicle seat 90, and the thigh 100 is positioned on the cushion 20.

As shown in FIGS. 11 and 12, two motors 28 are each embedded in one of the side bolsters 26 of the cushion 20. The eccentric weight 42 of each motor 28 is positioned in the cushion 20 relative to the point H. The eccentric weight 42 of each motor 28 is positioned a distance of approximately A +/−12.5 mm below the thigh centerline 98, approximately B mm +/−12.5 mm from a side of the plane, and approximately C +/−12.5 mm from a side of the thigh centerline 98. In one example, A is approximately 65 mm, B is approximately 0 mm, and C is approximately 185 mm. The motors 28 are also positioned at least approximately 7.5 mm below an upper surface of the cushion 20.

By using these values and ranges to determine the position of each of the two motors 28, the optimal position of each of the motor 28 in the cushion 20 can be determined, and the motors 28 are then positioned in this location within the mold prior to pouring in the liquid foam to form the cushion 20. The at least one motor 28 is therefore positioned such that vibrations generated by the at least one motor 28 will be felt by the $5^{th}$ percentile female based on size and the $95^{th}$ percentile male based on size.

Returning to FIG. 1, the sensor 80 monitors a road event. In one example, a road event occurs when the vehicle moves from its lane, another vehicle is approaching, a front collision occurs, or a rear collision occurs. When the sensor 80 detects a road event, a signal is sent to the controller 79. The controller 79 then sends a signal to the at least one motor 28. In response to the signal from the controller 79, the at least one motor 28 vibrates in the cushion 20 to provide a tactile signal that can be felt by the driver to alert the driver of the road event. In one example, the at least one motor 28 vibrates above 50 m/s$^2$ as measured at a seat-occupant interface at approximately 74 Hz.

The foregoing description is only exemplary of the principles of the invention. Many modifications and variations are possible in light of the above teachings, for instance, the inlet vanes may also have intermediate positions. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A seat cushion of a vehicle seat, the seat cushion comprising:
   a foam cushion; and
   a motor assembly disposed in the cushion, the motor assembly comprising a housing that comprises a first housing portion and a second housing portion that enclose a motor, a rim of the first housing portion and a rim of the second housing portion abutting each other along a perimeter of the housing, and sealed to one another by a sonic weld;
   wherein the rim of the first housing portion comprises a first ledge at an outer surface of the first housing portion, and a first projection at an inner surface of the first housing portion that extends beyond the first ledge;
   wherein the rim of the second housing portion comprises a second ledge at an inner surface of the second housing portion, and a second projection at an outer surface of the second housing portion that extends beyond the second ledge; and
   wherein the first projection abuts the second ledge, the second projection abuts the first ledge, and the first and second projections abut each other.

2. The seat cushion as recited in claim 1 wherein the foam cushion is made of polyurethane foam.

3. The seat cushion as recited in claim 1 wherein the foam cushion includes a seat portion having a substantially flat surface and a bolster on each side of the seat portion, and the motor assembly is located in one of the two bolsters.

4. The seat cushion as recited in claim 1 wherein the housing is made of nylon.

5. The seat cushion as recited in claim 1 wherein the motor vibrates in response to a road event.

6. The seat cushion as recited in claim 5 comprising a sensor and a controller, wherein the sensor is configured to detect the road event and send a first signal to the controller based on the detected road event, and wherein the controller is configured to send a second signal to the motor based on the first signal to cause the motor to vibrate.

7. The seat cushion as recited in claim 1 wherein one of the first housing portion and the second housing portion of the housing is an upper portion and the other of the first housing portion and the second housing portion of the housing is a lower portion, and the upper housing portion includes a substantially flat surface that extends longitudinally from a first end of the housing to an opposite second end of the housing, and the lower housing portion includes a substantially rounded surface.

8. The seat cushion as recited in claim 7 wherein the substantially flat surface of the upper housing portion of the housing is substantially parallel to a top surface of the cushion.

9. The seat cushion as recited in claim 8, wherein the substantially flat surface of the upper housing portion extends longitudinally in a direction parallel to a motor shaft of the motor.

10. The seat cushion as recited in claim 1 comprising:
    a sensor that detects a road event and sends a signal in response to the road event; and
    a controller that receives the signal from the sensor and sends another signal to the motor to cause the motor to vibrate in response to the road event.

11. The seat cushion as recited in claim 1 wherein the motor assembly is completely embedded and encapsulated in the foam cushion.

12. The seat cushion as recited in claim 11 wherein the motor assembly is leak-proof.

13. The seat cushion as recited in claim 1, wherein the sonic weld comprises a bead that extends around the rim of one of the first housing portion and second housing portion and is melted into a groove of one of the first and second ledges, and the groove is sized and shaped to receive the bead, the sonic weld providing a seal for the housing.

14. The seat cushion as recited in claim 13 wherein the melted bead is located closer to the inner surface of the housing than to the outer surface of the housing.

15. The seat cushion as recited in claim 13 wherein the bead has a triangular cross-sectional shape.

16. The seat cushion as recited in claim 13 wherein the sonic weld melts the bead into the groove.

17. The seat cushion as recited in claim 1 wherein the first housing portion and the second housing portion define an outer surface of the housing.

18. The seat cushion as recited in claim 1 wherein the first housing portion has a different shape than the second housing portion.

19. The seat cushion as recited in claim 1, wherein the perimeter of the housing is a longitudinal perimeter of the housing.

20. The seat cushion as recited in claim 1, wherein:
   the outer surface of the first housing portion and the outer surface of the second housing portion are flush with each other; and
   the inner surface of the first housing portion and the inner surface of the second housing portion are flush with each other.

21. The seat cushion as recited in claim 1, wherein the sonic weld is provided between the first projection and the second ledge.

\* \* \* \* \*